United States Patent [19]

Lopresti et al.

[11] Patent Number: 5,832,474
[45] Date of Patent: Nov. 3, 1998

[54] DOCUMENT SEARCH AND RETRIEVAL SYSTEM WITH PARTIAL MATCH SEARCHING OF USER-DRAWN ANNOTATIONS

[75] Inventors: Daniel P. Lopresti, Hopewell; Yue Ma; Jian Zhou, both of Plainsboro, all of N.J.

[73] Assignee: Matsushita Electric Industrial Co., Ltd., Osaka, Japan

[21] Appl. No.: 606,575

[22] Filed: Feb. 26, 1996

[51] Int. Cl.⁶ .................................................. G06F 17/30
[52] U.S. Cl. ...................... 707/2; 707/3; 707/6; 382/309
[58] Field of Search ............................... 395/606; 707/2, 707/3, 6; 382/309

[56] References Cited

U.S. PATENT DOCUMENTS

| | | | |
|---|---|---|---|
| 5,038,382 | 8/1991 | Llipscomb | 382/189 |
| 5,148,522 | 9/1992 | Okazaki | 395/358 |
| 5,194,852 | 3/1993 | More et al. | 345/182 |
| 5,220,649 | 6/1993 | Forcier | 707/530 |
| 5,325,475 | 6/1994 | Poggio et al. | 395/133 |
| 5,365,598 | 11/1994 | Sklarew | 382/189 |
| 5,455,901 | 10/1995 | Friend et al. | 395/768 |
| 5,463,696 | 10/1995 | Beernink et al. | 382/181 |
| 5,467,407 | 11/1995 | Guberman et al. | 382/186 |
| 5,553,284 | 9/1996 | Barbara et al. | 395/604 |
| 5,579,471 | 11/1996 | Barber et al. | 395/326 |
| 5,583,950 | 12/1996 | Prokoski | 382/212 |
| 5,600,775 | 2/1997 | King et al. | 707/500 |
| 5,613,019 | 3/1997 | Altman et al. | 707/530 |
| 5,625,721 | 4/1997 | Lopresti et al. | 382/309 |
| 5,625,814 | 4/1997 | Luciw | 395/605 |
| 5,666,139 | 9/1997 | Thielens et al. | 707/541 |
| 5,680,636 | 10/1997 | Levine et al. | 707/512 |
| 5,734,882 | 3/1998 | Lopresti et al. | 707/200 |

OTHER PUBLICATIONS

Rubine, Dean, "Specifying Gestures by Example," *Computer Graphics*, vol. 25, No. 4, Jul. 1991, pp. 329–337.
Advertisement, Copyright 1995, Visioneer, Inc. for Paper-Port Vx, "The Easiest Way to Get Paper Into Your Mac."
Product Literature, Copyright 1995, Cimmetry Systems, Inc. for AutoVue Professional, "The Enterprise–Wide Document Viewing and Markup Solution."

*Primary Examiner*—Wayne Amsbury
*Attorney, Agent, or Firm*—Harness, Dickey & Pierce, P.L.C.

[57] ABSTRACT

The document browser for electronic filing systems supports pen-based markup and annotation. The user may electronically write notes anywhere on a page and then later search for those notes using the approximate ink matching (AIM) technique. The technique segments the user-drawn strokes, extracts and vector quantizes features contained in those strokes. An edit distance comparison technique is used to query the database, rendering the system capable of performing approximate or partial matches to achieve fuzzy search capability.

14 Claims, 10 Drawing Sheets

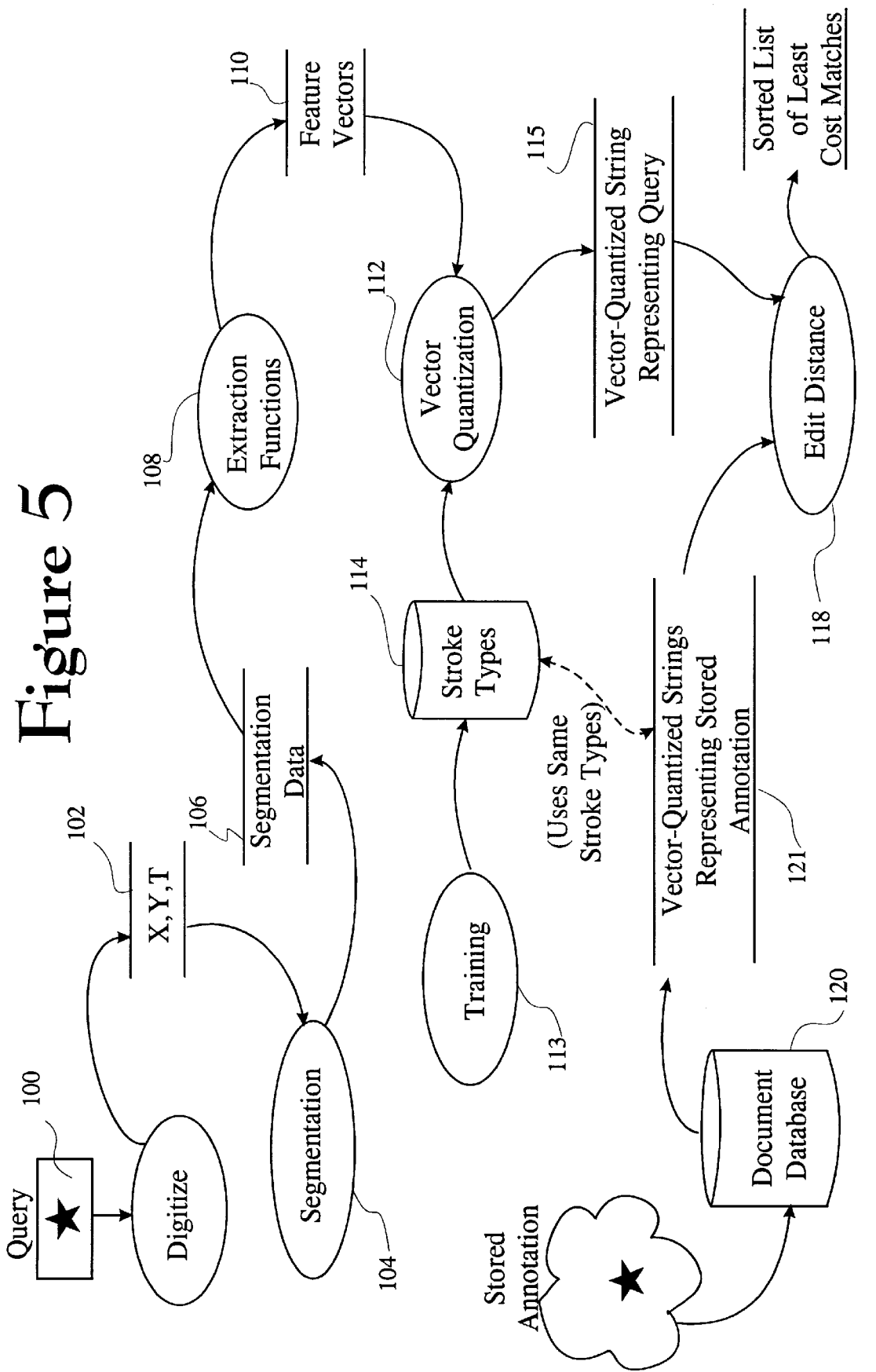

Figure 6

|   |   | c | o | m | p | r | e | s | s |
|---|---|---|---|---|---|---|---|---|---|
|   | 0 | 1 | 2 | 3 | 4 | 5 | 6 | 7 | 8 |
| c | 1 | 0 | 1 | 2 | 3 | 4 | 5 | 6 | 7 |
| o | 2 | 1 | 0 | 1 | 2 | 3 | 4 | 5 | 6 |
| m | 3 | 2 | 1 | 0 | 1 | 2 | 3 | 4 | 5 |
| p | 4 | 3 | 2 | 1 | 0 | 1 | 2 | 3 | 4 |
| a | 5 | 4 | 3 | 2 | 1 | ① | ② | 3 | 4 |
| s | 6 | 5 | 4 | 3 | 2 | 1 | 2 | ② | 3 |
| s | 7 | 6 | 5 | 4 | 3 | 2 | 3 | 2 | ② |

Stored Annotation (columns) / Query (rows)

| Back Pointers | |
|---|---|
| ← | Deletion |
| ↓ | Insertion |
| ↖ | Substitution |

Edit trace for "compass" → "compress":

- insert r
- substitute e for a or

- substitute r for a
- insert e

Figure 7

|   |   | T | h | i | s | | i | s | | c | o | m | p | r | e | s | s | i | o | n | . |
|---|---|---|---|---|---|---|---|---|---|---|---|---|---|---|---|---|---|---|---|---|---|
|   | 0 | 1 | 2 | 3 | 4 | 5 | 6 | 7 | 8 | 9 | 10 | 11 | 12 | 13 | 14 | 15 | 16 | 17 | 18 | 19 | 20 |
| c | 1 | 1 | 2 | 3 | 4 | 5 | 6 | 7 | 8 | 9 | — | — | — | — | — | — | — | — | — | — | — |

(table truncated — Matched Region indicated with diagonal back-pointer trace through "compress")

Stored Annotation (top) / Query: c o m p a s s (left)

DOCUMENT SEARCH AND RETRIEVAL SYSTEM WITH PARTIAL MATCH SEARCHING OF USER-DRAWN ANNOTATIONS

BACKGROUND AND SUMMARY OF THE INVENTION

The present invention relates generally to database search and retrieval systems. More particularly, the invention relates to a document annotation, search and retrieval system that supports searchable user-drawn annotations. Using a digitizing pen or other suitable drawing device, the user electronically draws annotations that are electronically displayed on and stored with a selected document within the database. The search engine is able to locate the annotated document in response to a user-drawn query by a partial match searching technique. The partial match searching technique compares temporal and spatial components of the user-drawn annotations without requiring translation into alphanumeric characters. Thus the search engine works with all forms of user-drawn characters, symbols, pictures and the like.

The partial match searching technique works at two levels. First, in the "ink" data type domain (temporal and spatial components of user-drawn annotations), a fuzzy match between the query ink and the database ink allows user-drawn annotations to be located in the database, even though the user does not draw the annotation in precisely the same way in entering a query. Second, the partial match (word spotting) technique can identify a portion of a user-drawn annotation, even though the entire annotation is not entered as the query. The preferred partial match searching technique handles both levels of approximate matching.

Traditional document storage databases rely on various indexing systems to allow the user to store and then later locate a document of interest. Conventionally, documents in the form of alphanumeric text can be directly searched using keyword searching techniques. Bitmapped images, scanned images and graphics are another matter. Conventionally bitmapped images, scanned images and graphics must first be indexed by adding alphanumeric numbers or keywords before those documents can be searched for and retrieved. Normally these index numbers and keywords are added by keyboard entry as alphanumeric text. Alternatively, optical character recognition (OCR) techniques can be used to convert bitmapped images of text into a form that may be directly searched using keyword searching techniques.

Although the use of alphanumeric text in search and retrieval systems works reliably in many database applications, there are many applications that are not well suited to document indexing and annotating by keyboard entry. The enterprise-wide document and image management system is a good example.

There is considerable interest today in document and image management systems that may be deployed through networking across an entire enterprise. Flexibility and ease of use are prime considerations. Use of existing office automation equipment, where possible, is also highly desirable. Thus, fax machines, photocopiers and flatbed scanners may be used as document input devices in a networked document storage and retrieval system. For example, an electronic image copy of a document may be captured and stored in a document database as a photocopy of the document is being made. Once stored in the database, a user connected to the database, as over a network, can view the document on-screen and can print a hard copy of the document using an attached printer. Such a document storage and retrieval system has the capacity to capture hundreds of thousands of documents that may be later shared with others on the network. Although these new systems promise a "paperless" office of the future, there is still considerable momentum behind the old-fashioned paper copy.

Heretofore the old-fashioned paper copy of a document is more useful to many, because it can be written on to add personal handwritten notes, underlining and other such user-drawn annotations. The difficulty with the old-fashioned paper copy is that these user-drawn annotations form no active part of the document database. Although it is possible to re-scan the document once annotations have been added, this unnecessarily enlarges the size of the document database and the annotations themselves form no part of the computer searchable indexing system.

The present invention represents a significant advance in document storage and retrieval systems. The invention permits user-drawn annotations to be readily incorporated into or associated with the stored document, without requiring duplication of the document. Significantly, the user annotations can be searched as part of a document retrieval query. Using a pen interface the user electronically makes one or more annotations on the displayed image of a stored document. These annotations become associated with the stored document and may be searched to later retrieve the document. The system captures user-drawn annotations as a sequence or string of "ink" strokes, capturing the precise (X,Y) position of the pen tip over time as the user writes or draws an annotation. Thus the ink data type captures not only the spatial position of the ink but also the temporal sequence over which the ink is applied as the user draws the annotation.

By facilitating the search and retrieval of hand-drawn annotations, the present invention becomes extremely powerful in multilingual applications. For example, the user can readily enter hand-drawn Kanji (Chinese or Japanese) and/or Arabic annotations without requiring a suitably programmed keyboard. This is a significant advantage over any system based on keyboard entry alone.

The electronic ink strokes are stored in association with the document image, allowing the user-drawn annotation to be displayed on the display screen, at the originally-drawn location, when the document is retrieved from the database for viewing. The document browser includes a document query tool for the user to enter annotation search requests. The query tool presents a window into which the user draws a query request using the pen. For example, the user can write the word "Important!" in the query window and the search engine will then search the document database for all occurrences that match the user's hand-drawn entry "Important!". The search engine does not require an exact match, rather it has the flexibility to identify multiple variations of the hand-drawn entry (fuzzy matching). Furthermore, the search engine is able to search for a portion of the annotation in question. Thus the user could write "Important" and find all occurrences of the annotation "Important information."

The search engine performs ink stroke pattern matching that does not require a translation of the ink stroke into an alphanumeric character. Indeed, the system works quite well with user-drawn symbols of any arbitrary design. Thus there is no need to rely on unreliable handwriting recognition algorithms. However, if desired, handwriting recognition algorithms can be performed in background to augment the system's searching capabilities. Use of handwriting recognition to augment system performance is applicable to annotations consisting of text.

Accordingly, in one aspect the invention provides a document search and retrieval system that employs a memory having a first data structure for storing document data and a second data structure for storing annotation data. The system also includes a user interface having a drawing tool for user input of stroke data corresponding to a user-drawn annotation. The stroke data has spatial and temporal components. The user interface communicates with the second data structure to store the spatial and temporal components of the stroke data in association with a user-selected portion of the document data. In practice, the stroke data corresponding to a user-drawn annotation may be associated with a region on a page of a document.

The system further includes a search engine that communicates with the user interface to receive a user-drawn search query comprising stroke data. The search engine communicates with the second data structure for matching patterns in the spatial and temporal components of the search query with patterns in the spatial and temporal components of the user-drawn annotation. The search engine ranks at least a portion of the annotations in the database based on the search results and presents them to the user in the form of one or more hypotheses. Preferably, the system will return the search results to the user in decreasing order of "goodness."

The search engine then accesses the first data structure to select a portion of the document data that corresponds to the user-selected match hypothesis. In this way the page or other portion of the document data associated with the user-drawn annotation is retrieved for viewing by the user.

For a more complete understanding of the invention, its objects and advantages, reference may be had to the following specification and to the accompanying drawings.

BRIEF DESCRIPTION OF THE DRAWINGS

FIG. 5 is a software block diagram of the search and retrieval system of the invention;

FIG. 6 is a functional diagram illustrating the basic edit distance technique used by the preferred embodiment;

FIG. 7 is another functional diagram illustrating how a partial match may be performed with the edit distance technique;

DESCRIPTION OF THE PREFERRED EMBODIMENT

Figure 1:
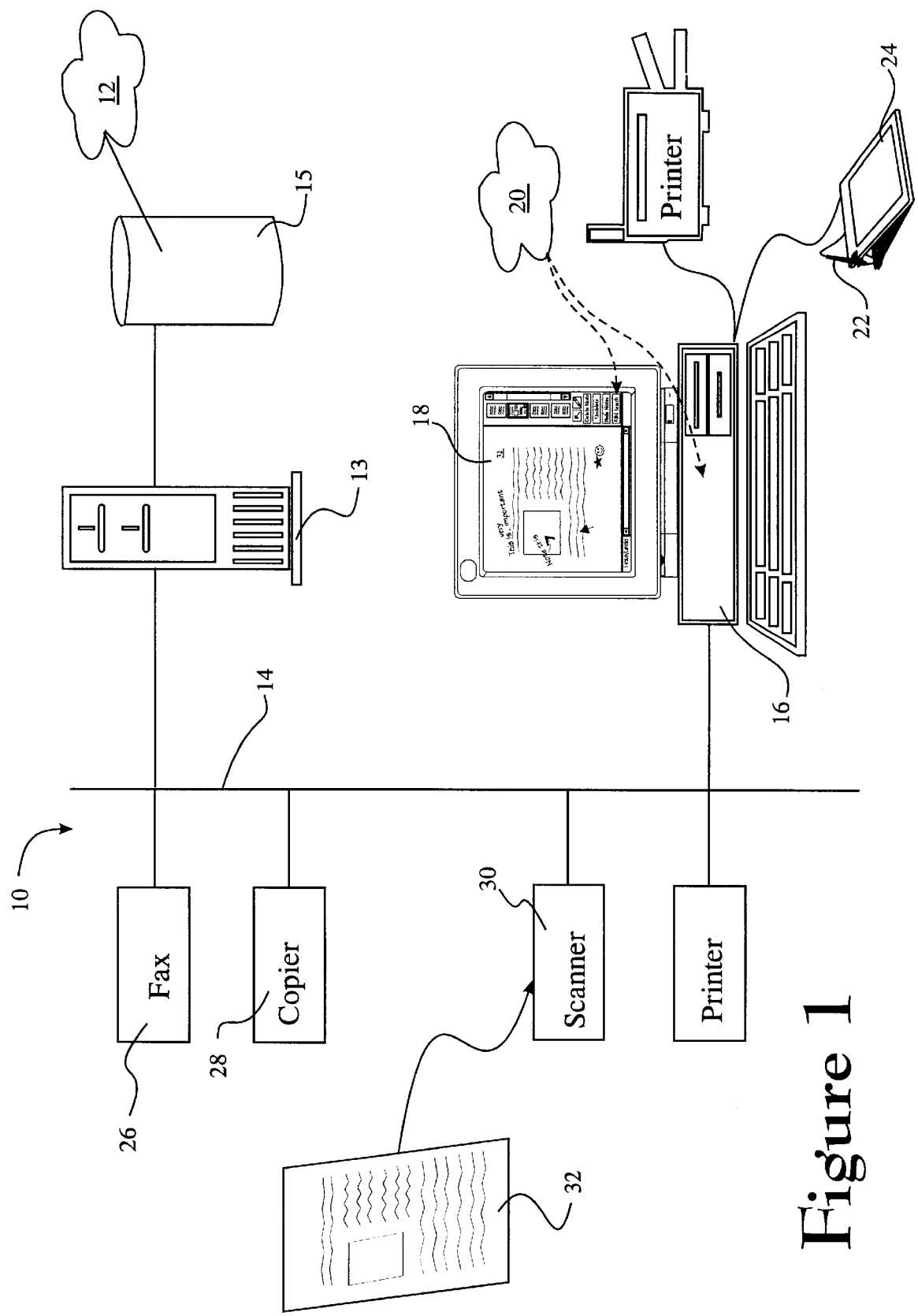
FIG. 1 is a block diagram illustrating an exemplary embodiment of the invention.

Referring to FIG. 1, a network-based document storage and retrieval system is illustrated generally at 10. The illustrated system is merely one possible configuration. In FIG. 1 the document database is diagrammatically illustrated at 12. It will be understood that the document database can take many forms. For example, the document database may be implemented as a file server 13, with digital documents being stored on a suitable read/write storage media such as hard disk 15. The file server and its associated storage media may form part of a computer network connected via a suitable communication transmission link such as illustrated generally at 14.

Figure 2:
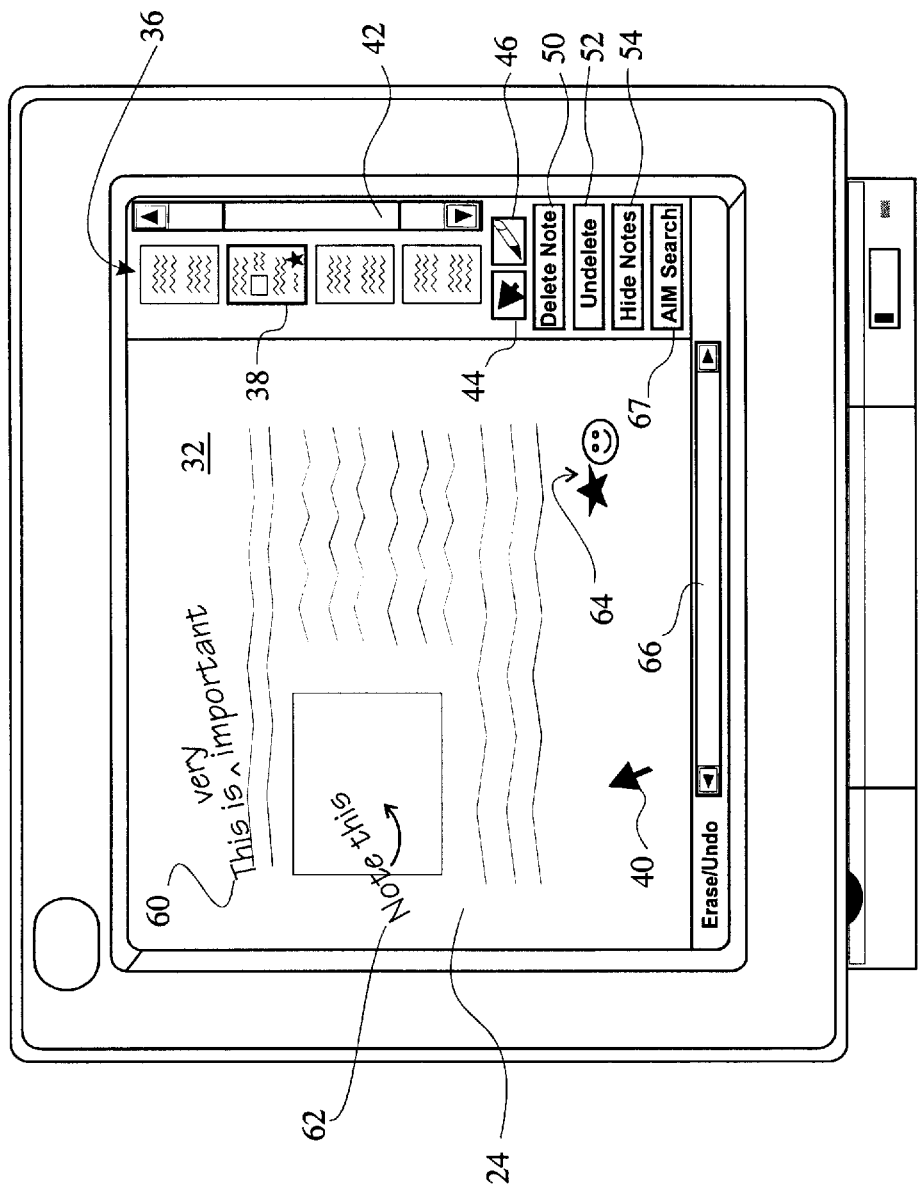
FIG. 2 illustrates one possible document browser screen useful in understanding the annotation capabilities of the invention.

The network may also include one or more computer workstations, such as workstation 16 having monitor 18 and running a client document browser application 20. In FIG. 2 the document browser application is shown as its display would appear on monitor 18. It will be understood that the browser software application is actually running on workstation 16 and that the display appearing on monitor 18 is produced by the running browser application.

The workstation 16 is provided with a drawing tool, such as a pen 22 and digitizing tablet 24. The pen and digitizing tablet is coupled through the user interface of the browser application 20, allowing the user to draw on the tablet with the pen and see the results appear as annotations on the document browser display screen.

Regarding the drawing tool, although a digitizing tablet and pen is illustrated here, alternate embodiments are possible. For example, a light pen could be used to draw directly on the monitor screen in lieu of the digitizing tablet and pen. Alternatively, a suitably programmed pen computer or personal digital assistant (PDA), such as the Apple Newton could be used.

The browser application 20 running on workstation 16 communicates over the network 14 to retrieve and display documents stored in database 12. As will be described, the user may interact with these documents using the drawing tools provided at the workstation.

There are a number of ways to input documents into the document database. Several options are illustrated in FIG. 1. Digitized images of documents can be input from a number of sources including the fax machine 26, the photocopy machine 28 and the scanner 30. In FIG. 1 a hard copy page 32 is input through scanner 30 and its digital image appears in the display window of document browser 20.

The scanned images from the input devices such as fax machine 26, photocopier 28 and scanner 30 may be stored as bitmapped images in a variety of commercially available formats. The image data may be compressed, if desired. Alternatively, the image data may be converted to vector graphic data and stored in that form.

In addition to scanned document images, the document database can also store documents that are generated by software applications such as word processors, multimedia authoring applications, graphic illustration applications, computer-aided design applications, spreadsheet applications, on-line and network-based applications (such as those generating documents for the World Wide Web, in HTML or the like). These applications may run on one or more workstations connected to network 14. The document database may be distributed over a number of machines, or over a local or wide area network. There is no requirement that all devices be connected at all times to the network.

Document data may be added to the database in real-time or batched mode, by direct connection to the network or over any suitable telecommunications link.

In a typical office setting the digital output of a suitably equipped photocopier may be connected to the data processing network, along with a suitable number of workstations, fax machines and scanners deployed throughout the workspace. The document database may reside on a file server that may optionally be used for other purposes such as supporting other office automation functions. Hard copies of documents may be printed using any network printer or workstation printer.

For a better understanding of the capabilities of the invention, refer to FIG. 2, which shows the browser application 20 in greater detail. In this regard, the particular configuration and layout of the various windows and user controls represents one of many possible configurations. Other arrangements are possible without departing from the spirit of the invention.

In FIG. 2 the image of a selected document is displayed in display window 24. For illustration purposes here, an image of document 32 is displayed. At the upper right-hand segment of the screen 36 there is a series of thumbnail sketches of various document pages that have been located by the search engine for selection by the user. The thumbnail sketch of the currently selected document image is highlighted, as with highlight box 38. To select a different image for viewing, the user simply selects a different thumbnail sketch with the pointer cursor or annotation pen cursor. In this regard, the cursor 40 may be controlled by moving the mouse or by positioning the pen at a preselected location on the tablet. The thumbnail sketches are tied to a scroll bar 42 that the user can manipulate to scroll through and display different thumbnail sketches in the thumbnail display region 36.

Several user-selectable push button controls are provided in the lower right-hand portion of the display. These include alternately selectable cursor and pen but tons 44 and 46. When the cursor button is selected, as illustrated here, the standard pointer cursor 40 is displayed. When the pen button 46 is selected, the annotation pen cursor is displayed instead of the pointer cursor. The annotation pen cursor (which will be illustrated and described more fully later) identifies the location at which user-drawn annotations will be placed on the digital image of the document.

In addition to these two buttons, the presently preferred embodiment also provides a delete note button 50 for deleting an annotation, an undelete note button 52 for undeleting a deleted annotation, and a hide notes button 54 for hiding all annotations without deleting them. The buttons are modal; their functions change depending on whether an annotation has been selected or not. If a document (but no annotation) is selected, then the delete and undelete operations are perform ed on the document (the corresponding labels on the buttons are changed to so indicate). If an annotation is selected, then the buttons function as described above to delete and undelete the selected annotation. The hide notes button 54 is also modal. It changes to "show notes" whenever the notes are hidden.

In FIG. 2 several separate annotations have been illustrated. Specifically, a first annotation appears at 60, a second annotation at 62 and a third annotation at 64. Note that the third annotation is a series of nontext symbols or pictures.

In the presently preferred embodiment the browser application displays user-drawn annotations in a different color, such as in red ink, making the annotations readily stand out from the remainder of the displayed document.

Figure 3:
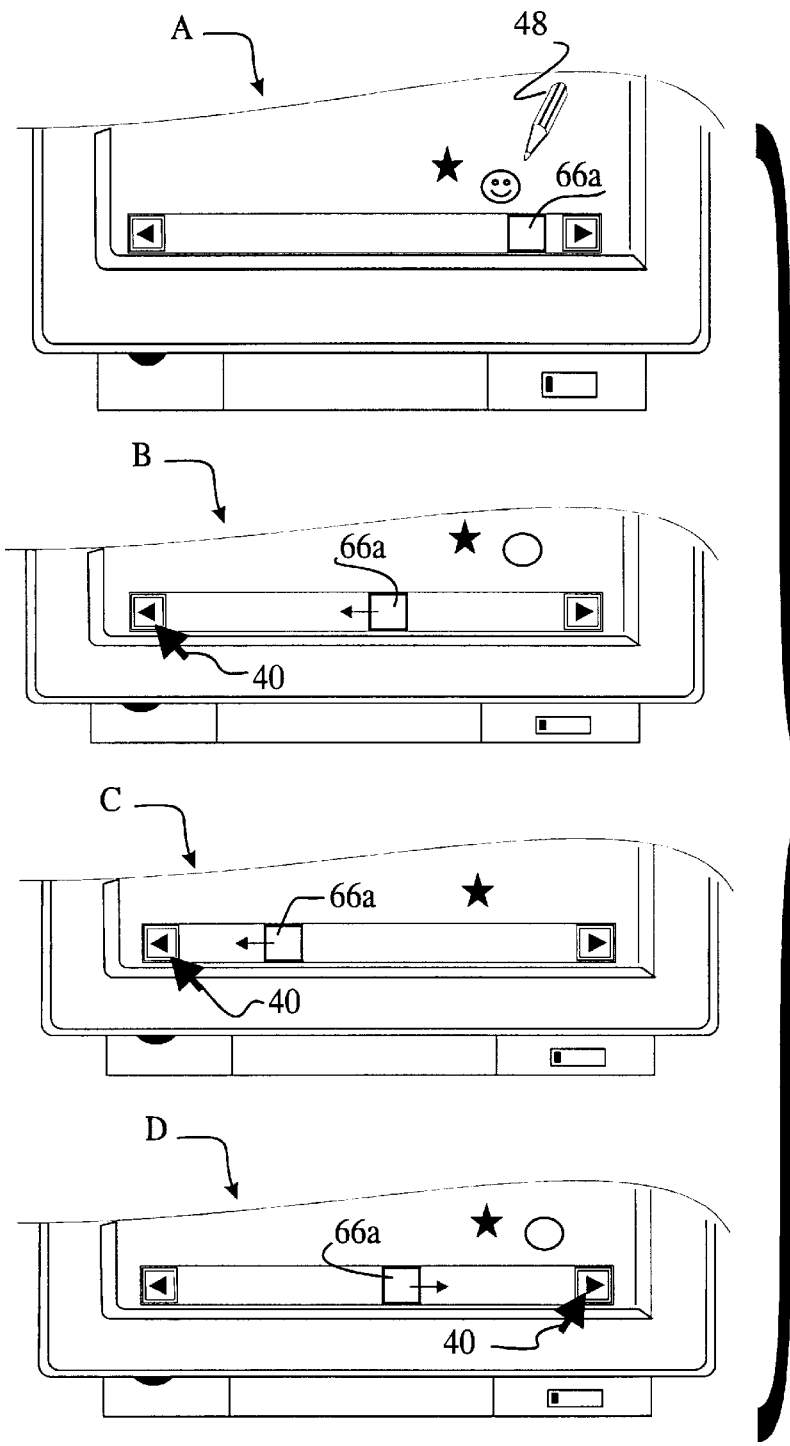
FIG. 3 is a detailed view illustrating the operation of the annotation editing slider bar.

Adding annotations to a document is easy. Referring to FIG. 3, the user simply activates the pen button 46 to display the pen cursor 48. Then, using the pen 22 and digitizing tablet 24 (or other suitable drawing tool provided) the user simply positions the pen cursor above the area he or she wishes to annotate and then begins writing or drawing. Any mistakes during creation of the annotation may be corrected using the ink edit slider bar 66.

As will be more fully explained below, annotations are stored as sequential space/time data. Each stroke of the user's pen is recorded somewhat analogous to a digital movie. The ink edit slider bar deletes the pen stroke data, proceeding backward in time from the end of the final stroke towards the beginning of the first stroke. Any strokes deleted in using the slider bar may be undeleted by sliding the slider bar in the opposite direction. A permanent deletion takes effect only when a new annotation is begun.

FIG. 3 illustrates the operation of the ink edit slider bar. In FIG. 3 at A a nontext user annotation is illustrated in its entirety. At B the last drawn ink strokes are deleted from the annotation by activating the left-hand slider bar button with pointer cursor 40. Note that the slider bar position indicator 66a has moved to the left as the left-hand slider bar button is actuated. Note that this has erased the "face" from the oval annotation. As further indicated at C, continued activation of the left-hand slider bar button by pointer cursor 40 erases even more of the user-drawn annotation, in reverse sequence to the manner in which it was drawn. Again note that the position indicator 66a has moved still farther to the left. As illustrated at D, the erasure can be reversed by activating the right-hand slider bar button by the pointer cursor 40. In this case, the slider bar indicator 66a moves to the right and a portion of the user-drawn annotation is restored. The slider bar thus operates to fully erase and fully restore the user-drawn annotation, simply by actuation of the respective left-hand and right-hand slider bar buttons.

The ink edit slider bar allows the user to pick up the pen and write more after having deleted some of the ink using the slider.

The ink edit slider bar can be implemented in alternate ways. It may be implemented as a stroke-based procedure, in which case entire pen strokes are deleted and undeleted at once. Alternatively, the ink edit slider bar may be implemented as a point-based procedure, in which case the delete and undelete operations are performed on a point-by-point or pixel-by-pixel basis. The application would work essentially the same way as far as the user is concerned, although the point-based procedure would allow for a more fine-grained control over annotation editing.

The presently preferred embodiment displays the user-drawn annotations directly on the face of the document. If desired, the user annotation can be displayed as if drawn on an opaque stick-on note, to simulate the appearance of a note adhered to the face of the document. In this case, a rectangular area is defined around the user-drawn annotation and the rectangular area is filled in with a user-selected background color that opaquely covers that portion of the document page behind the rectangular area.

One of the advantages of the preferred embodiment is the ability to record multiple annotations on a single page. The system automatically treats as separate annotations those pen strokes that are (a) at spatial locations separated by more than a predetermined distance; (b) drawn at different times (i.e. at a temporal spacing above a predetermined time limit); or (c) where there is some user interface activity between two annotations (such as an operation of one of the user interface buttons).

All user-drawn annotations, entered in this fashion, are stored in association with a given page of the document. Using the workstation's printer, or a printer attached to the network, the document page can be printed either with or without the annotations, simply by selecting or deselecting the hide notes button.

Figure 4:
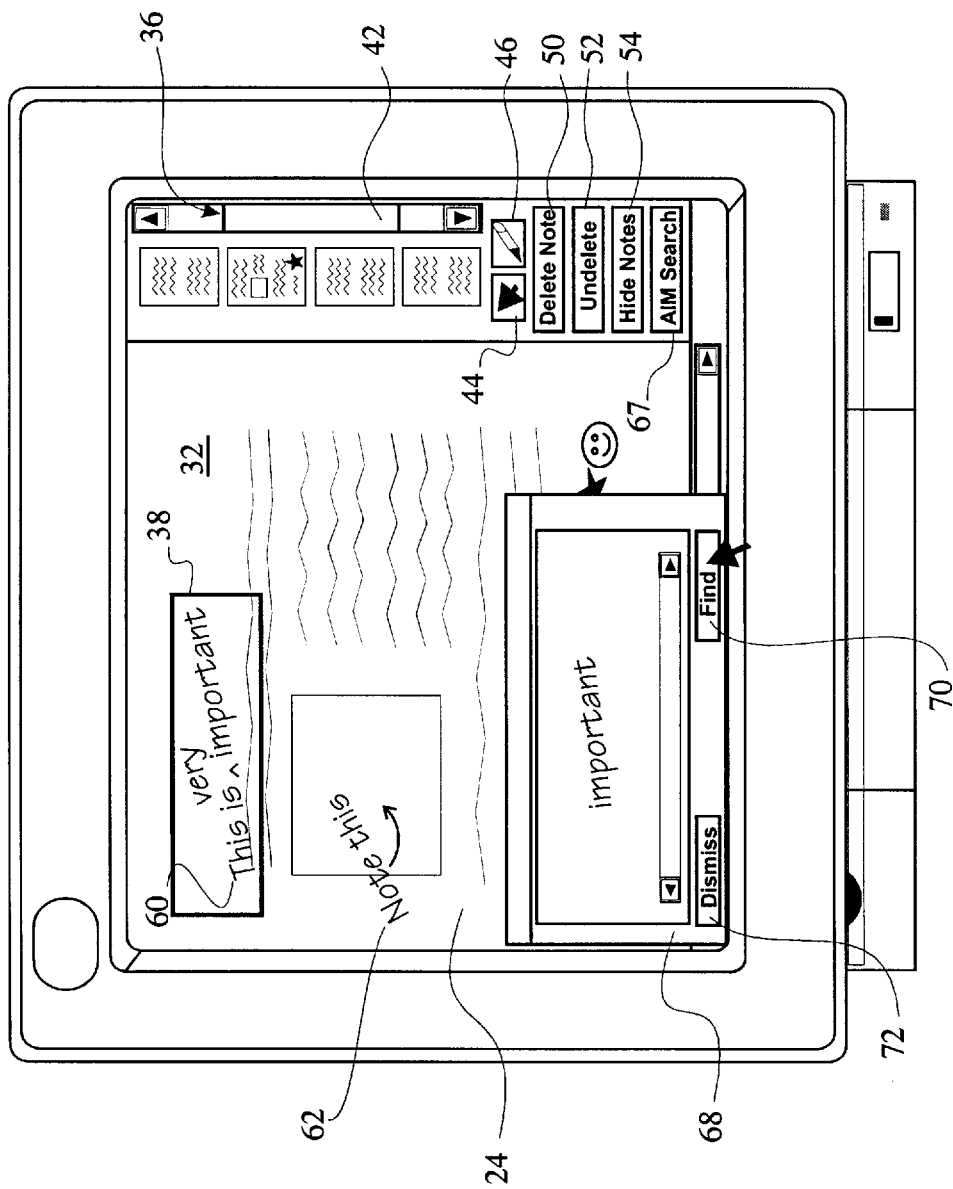
FIG. 4 illustrates one possible user interface screen for inputting an annotation query in using the invention.

The true power of the invention is fully realized through the annotation search capability. By pressing the annotation search button 67 a query dialog box 68 is presented as illustrated in FIG. 4. To search for a document containing any user-drawn annotation, the user simply draws all, or even part of, the desired annotation in the query dialog box and then engages the search engine by actuating the find button 70. The query dialog box also includes the ink edit slider bar that operates as previously described, and also a dismiss button 72 that is used to cancel a query search request and return to the main view window. Because the system is event-driven, the query dialog box can be made to disappear by simply selecting another window on the display screen.

Actuation of the find button causes the search engine to search the stored annotations for those annotations that represent a possible match with the query. A partial match search procedure is used that ranks annotation data according to how closely or poorly each annotation matches the query. The n-best matches are then displayed, in order of "goodness" in the thumbnail sketches of the main browser screen. In addition, the "best" match is also displayed in the main display window, as illustrated in FIG. 4. In the presently preferred embodiment all documents that contain annotations are ranked and displayed in the appropriate order. Thus the n-best matches would represent all matches.

Because a given page may contain multiple annotations, the preferred embodiment highlights the specific annotation that corresponds to the match in question. The presently preferred embodiment highlights the specific annotation by drawing a bounding box 38 around it. Of course, other forms of image highlighting may also be used, such as altering the color or intensity of the annotation, blinking the annotation, and so forth.

By repeatedly actuating the find button 70, the user can cycle through the ranked list, with the associated documents being displayed in the main browser window. To supply the user interface cue of this functionality, the label of the find button 70 changes to "next" upon display of the ranked list corresponding to a particular query.

Thanks to the partial match (word spotting) procedure, the search engine is able to search for substrings within complete annotations. This is illustrated in FIG. 4. In FIG. 4 a substring match is performed to locate the word "important" within the full string "This is very important!" This is an important feature, for it allows the user to find a relevant annotation, even if he or she cannot remember the precise wording of the complete annotation. Although the partial match procedure is referred to herein as a word spotting procedure, the procedure is not limited to text. The partial match or word spotting procedure works equally well with nontext user-drawn annotations.

Figure 8:
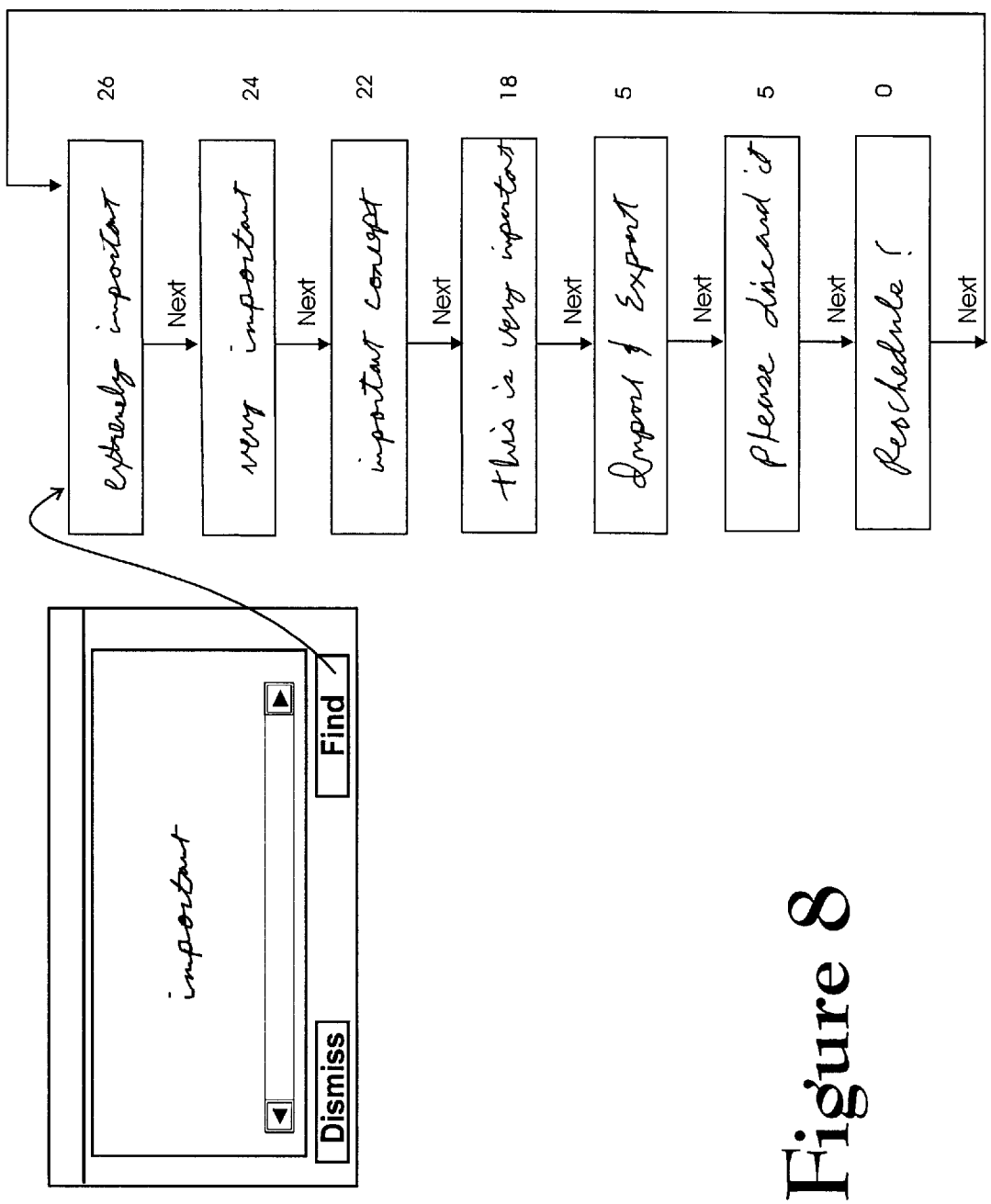
FIG. 8 illustrates the manner in which a user-entered query will select multiple candidates, sorted on the basis of score.

As will be more fully explained below, the partial match procedure is a fuzzy search procedure that identifies and ranks possible substring match candidates based on a scoring and ranking distance between the query and the candidate. The procedure produces a score for each candidate, allowing the candidates to be ranked in order of "goodness." This is illustrated in FIG. 8, wherein the query searches for all occurrences of the user-drawn query "important." In FIG. 8 the candidate receiving the highest score (in this case a score of 26) appears at the top of the sorted list. The first click of the find button will return the best match, which is ranked highest in the ink search. Repeated use of the find button will continue to find the next best match, working down the sorted list from top to bottom.

Figure 9:
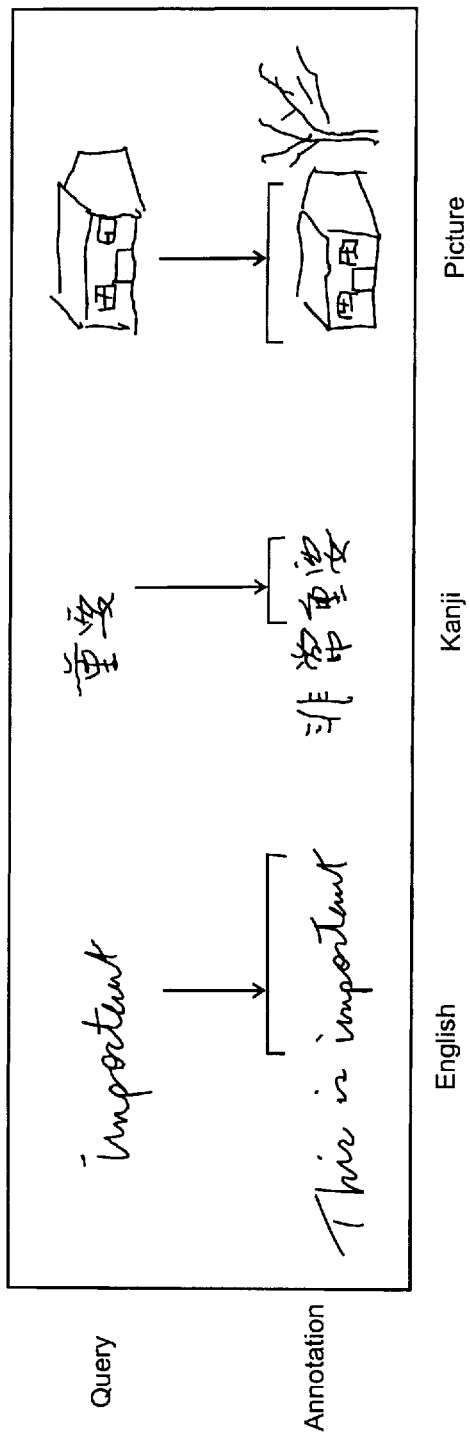
FIG. 9 is a diagram illustrating the partial match or word spotting functionality of the invention through English, Kanji and pictorial examples.

FIG. 9 shows the word spotting capability of the substring match procedure. In FIG. 9 several example queries and corresponding annotations are presented. In each case, the matching procedure is able to identify a matching substring within the full annotation.

Figure 10:
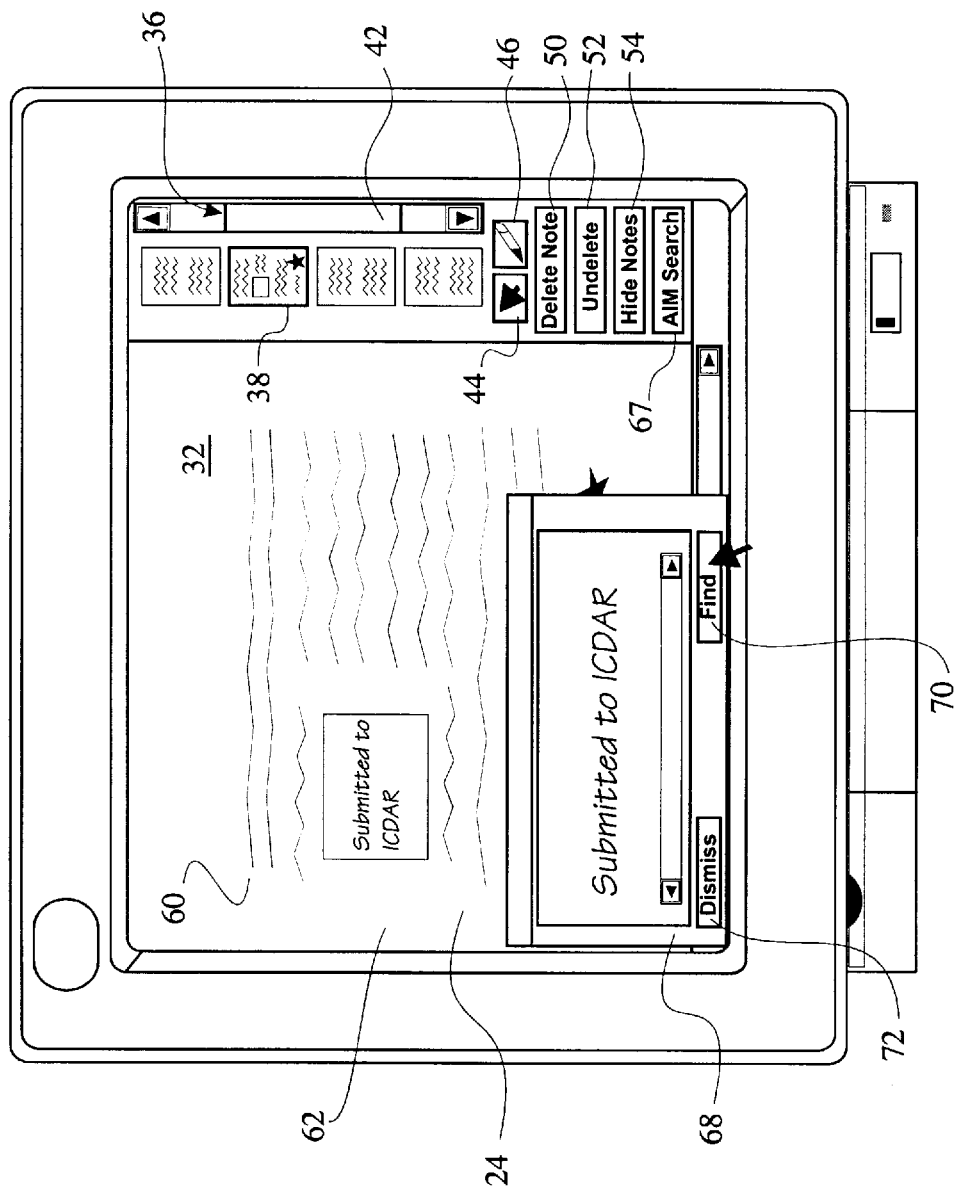
FIG. 10 illustrates how line breaks have no impact on the ink search strategy of the presently preferred embodiment.

Another benefit of the partial match procedure is that line breaks in the user-drawn annotation or query have no impact on the ink search. This is illustrated in FIG. 10, where the user-drawn annotation appears as two lines, whereas the query is entered as one line. The line break in writing the annotation is ignored so that the user does not have to remember where the line breaks may have occurred in the original annotation.

Figure 11:
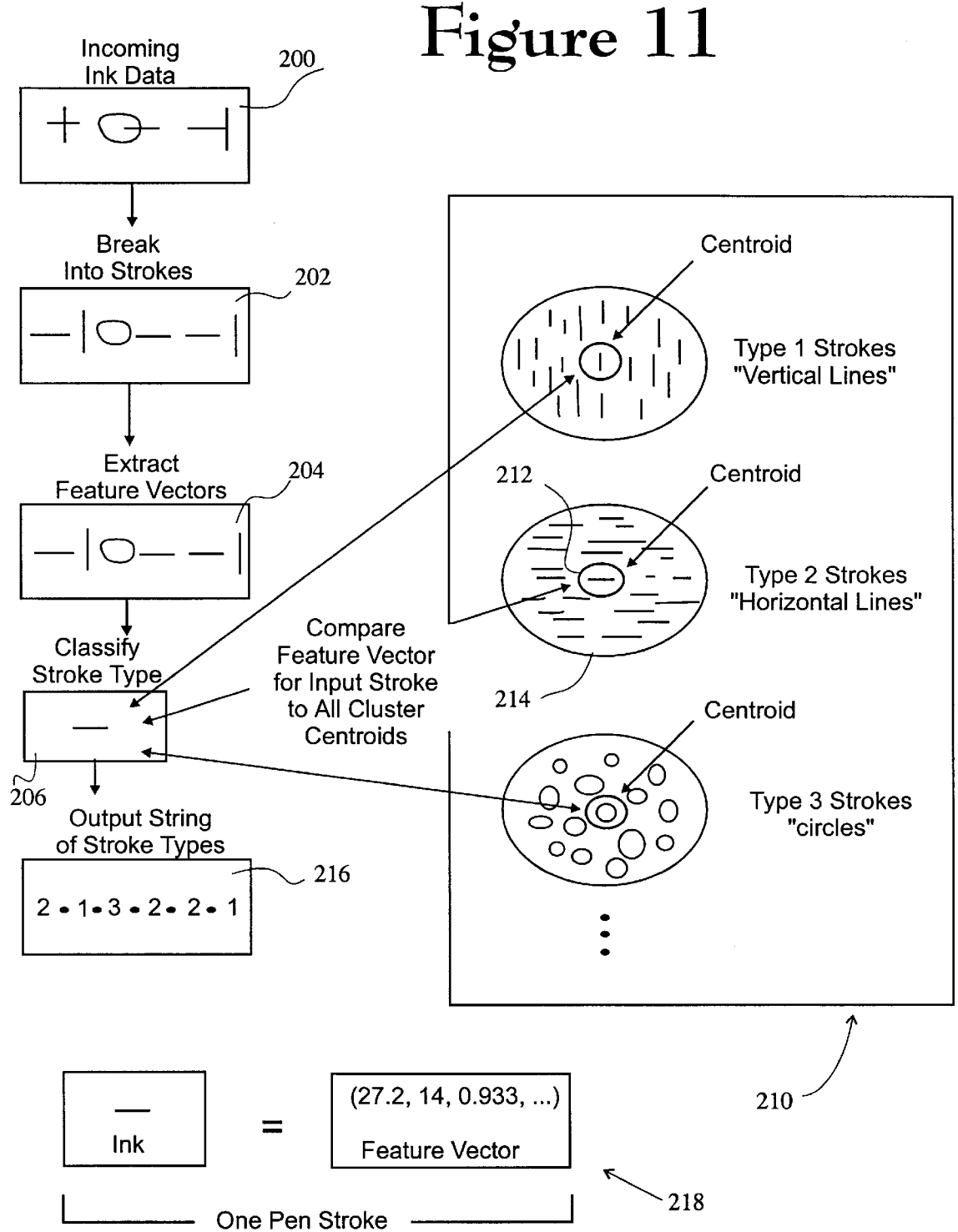
FIG. 11 is a flowchart diagram illustrating the pen stroke classification using vector quantization according to the presently preferred embodiment.

The fuzzy search technique of the preferred embodiment uses a vector quantized (VQ) representation of the user-drawn annotations to capture and compare pen strokes of the ink data type. FIG. 11 gives an overview of the manner in which pen stroke classification is performed using vector quantization. The ink data type records the motion of the pen tip over the surface of the digitizing tablet as a string of (X,Y) ink points. The individual (X,Y) ink points are sequentially captured, thereby preserving the temporal or time-based component of the data. Thus the ink data type may be considered as comprising (X,Y,T) vectors.

As illustrated in FIG. 11, the incoming ink data 200 is broken into strokes as at 202. Segmenting the ink data into strokes allows each stroke to be analyzed separately. By way of illustration, FIG. 11 shows that the plus sign (+) in the incoming data 200 was drawn by the user first forming a horizontal line and then forming a vertical line. This is illustrated at 202 by reading the segmented data at 202 from left to right.

After stroke segmentation the individual strokes are then analyzed to extract feature vectors. This is shown diagrammatically at 204. In FIG. 11, the extracted feature vectors are shown graphically to simplify the presentation. In the actual embodiment, the extracted feature vectors are represented as numerical data that is stored in the computer. As indicated at 206, each extracted feature vector is classified according to a predetermined code book 210. The presently preferred embodiment stores 64 clusters of stroke types, each cluster being represented by its centroid or average stroke of that type. As in the case of the extracted feature vectors (block 204) the feature vector clusters are stored as numerical computer data. In FIG. 11 the data comprising code book 210 are shown graphically (instead of numerically) to simplify the presentation. In FIG. 11 note that the horizontal line segment of block 206 most closely matches the centroid 212 of the Type 2 stroke cluster 214. Thus in the output string (block 216) the VQ code 2 is used to represent the horizontal line in block 206. In block 216 the leftmost numeral 2 corresponds to the leftmost horizontal line stroke. The remaining codes represent the remaining ink strokes comprising the original incoming ink data.

Through the above-described procedure the incoming ink data is converted, pen stroke by pen stroke, into a feature vector that is then stored in the computer database as the user-drawn annotation. This is depicted at 218.

To further illustrate, a software block diagram of the presently preferred embodiment is shown in FIG. 5. The annotation system operates on digitized pen stroke data that is ultimately represented as an "ink" data type. As will be illustrated, it is not necessary to convert the ink data type into an ASCII character data type in order to perform the search and retrieval procedures. Indeed, in the case of graphical (nontext) annotations, conversion to ASCII would have no meaning.

Illustrated in FIG. 5, the user-drawn query 100 is captured as a string of (X,Y) ink points, corresponding to the motion of the pen tip over the surface of the digitizing tablet or pad as the user draws query 100. The presently preferred embodiment digitizes this information by sampling the output of the digitizing pad at a predetermined sampling rate. Although a fixed sampling rate is presently preferred, the invention can be implemented using a variable sampling rate, as well. By virtue of the digitized capture of the X,Y position data, both spatial and temporal components of the user-drawn pen strokes are captured.

In the presently preferred embodiment, employing a fixed sampling rate, each X,Y data point is associated with a different sampling time. Because the sampling rate is fixed, it is not necessary to store the sampling time in order to store the temporal data associated with the pen stroke. Simply recording the X,Y position data as a sequence automatically stores the temporal data, as each point in the sequence is known to occur at the next succeeding sampling time.

In the alternative, if a variable sampling rate system is implemented, (X,Y,T) data is captured and stored. These data are the (X,Y) ink points and the corresponding time T at which each ink point is captured.

The raw ink point data is stored in data store 102. Next, a segmentation process 104 is performed on the stored ink point data 102. The presently preferred segmentation process searches the ink point data 102 for Y-minima. That is, the segmentation process 104 detects those local points at which the Y value coordinate is at a local minimum. In hand-drawing the letter "V" as a single continuous stroke, the lowermost point of the letter "V" would represent a Y-minima value.

Segmentation is performed to break the raw ink point data into more manageable subsets. These segment subsets may be designated using suitable pointers to indicate the memory locations at which the Y-minima occur. In this case, these segmentation pointers may be stored at 106 to be associated with the ink point data 102 previously captured. In the alternative, if desired, the segmented data may be separately stored in one or more memory buffers instead of using pointers.

Once the raw data has been segmented the individual segments or pen strokes are operated on by a set of extraction functions 108. The presently preferred embodiment operates on the pen stroke (segment) data using 13 different extraction functions. These extraction functions each extract a different feature of the pen stroke data that are then used to construct a feature vector. Table I lists the presently preferred features that are extracted by the extraction functions 108. For further background information on these extraction functions, see Rubine, Dean, "Specifying Gestures by Example," *Computer Graphics,* Vol. 25, No. 4, July 1991. The feature vectors of a given stroke are diagrammatically represented in FIG. 5 at 110.

TABLE $$f_1 = \frac{x_2 - x_0}{\sqrt{(x_2 - x_0)^2 + (y_2 - y_0)^2}}$$

$$f_2 = \frac{y_2 - y_0}{\sqrt{(x_2 - x_0)^2 + (y_2 - y_0)^2}}$$

$$f_3 = \sqrt{(x_{max} - x_{min})^2 + (y_{max} - y_{min})^2}$$

$$f_4 = \arctan\left(\frac{y_{max} - y_{min}}{x_{max} - x_{min}}\right)$$

$$f_5 = \sqrt{(x_{P-1} - x_0)^2 + (y_{P-1} - y_0)^2}$$

$$f_6 = \frac{x_{P-1} - x_0}{f_5}$$

$$f_7 = \frac{y_{P-1} - y_0}{f_5}$$

Let $\Delta x_P = xs_{P+1} = x_P$ and $\Delta y_P = y_{P+1} - y_P$ and $\Delta t_P = t_{P+1} - t_P$ $$f_8 = \sum_{P=0}^{P-1} \sqrt{\Delta x_P^2 + \Delta y_P^2}$$

$$f_9 = \sum_{P=1}^{P-2} \theta_P$$

$$f_{10} = \sum_{P=1}^{P-2} |\theta_P|$$

$$f_{11} = \sum_{P=1}^{P-2} \theta_P^2$$

$$f_{12} = \max_{P=0}^{P-2} \frac{\Delta x_P^2 + \Delta y_P^2}{\Delta t_P^2}$$

$$f_{13} = t_{P-1} - t_0$$

Where P represents the total number of points.

The extracted feature vectors represented at 110 are then coded or quantized by comparison with a predetermined set of clusters of stroke data types. The feature vector data 110 is quantized by vector quantization process 112 to assign each cluster to the closest predetermined stroke type. In this regard, the presently preferred embodiment defines 64 different stroke types that are each represented by a different name or number. Although the presently preferred system uses 64 different stroke types, the principles of the invention can be employed with a greater or fewer number of stroke types.

The predetermined stroke types are arrived at during a training procedure 113. The training procedure may be used to predetermine a vector quantization (VQ) code book 114 that is then used for multiple users. Alternatively, the training procedure can be used prior to use by an individual user. Both applications work well. In either case, the system is still user-dependent because there can be a great deal of variation in the way two different people draw the same annotation. Thus the preferred embodiment is best suited to searching one's own annotations.

If the document database is shared among multiple users, it is possible for each user to have his or her own personal set of annotations that can be searched and that are nevertheless "invisible" to everyone else. Alternatively, the annotations may be shared, too. As noted above, shared annotations are more difficult to implement due to the potential variation in the way different people draw the same annotation.

Training involves processing a small portion of training data that the user inputs by hand using the digitizing tablet and pen. The training data are processed by segmentation and feature extraction, as discussed above. The resulting feature vectors from the training data are then processed using conventional clustering techniques that identify the 64 most disparate clusters to represent the 64 stroke types for that training sequence. Numerical values or suitable other naming conventions a re used to name each of the identified stroke types in the training set. These data are then stored as a code book of the user-dependent stroke types 114. These stored training data values are used in performing the vector quantization process 112.

Essentially, the stroke data for a given user-drawn annotation may be considered as a string of symbols. As originally input in the form of raw (X,Y,T) data, the string of symbols correspond to actual spatial and temporal components of the pen stroke across the digitizing tablet. Through the series of processing steps described above, this string of symbols is converted into a string of symbols of the stroke data type, i.e. a string of vector quantized symbols stored at 115.

It will be appreciated that in most cases the user will not draw the same annotation in precisely the same way each and every time. That is, the (X,Y,T) coordinates and temporal properties of a given annotation may vary somewhat, each time the user draws that annotation. The presently preferred system accommodates this variation first by the manner in which the vector quantization is performed. Specifically, the vector quantization process 112 assigns each input stroke to the predetermined vector from the user-dependent stroke types 114 that represents the closest match.

After each of the strokes representing the query has been processed in this fashion, a comparison is made between those strokes and the user-drawn annotations that have been stored in association with the documents in the database 120. Thus, for example, the query "important" may be compared against the stored annotation "this is very important!" An edit distance analysis is performed to make this comparison.

Shown as edit distance analysis process 118, the query stroke type string is compared with each of the stored annotation stroke type strings 121 of the database 120. The edit distance analysis compares each stroke type value in the query string with each stroke type value in each of the annotation strings. A edit distance computation is performed by this comparison, yielding the "cost" of transforming (or editing) one string into the other. The individual string/string comparisons are then ranked according to cost, with the least cost resultants presented first. In this way, a sorted list comprising all or the n-best matches is displayed in the thumbnail sketches of the main browser screen.

FIG. 6 shows the basic edit distance technique. In this case, the stored annotation "compress" is compared with the query string "compass." It should be understood that FIG. 6 depicts the comparison of two strings as a comparison of individual letters in two differently spelled words. This depiction is intended primarily to aid in understanding the edit distance computation technique and not necessarily as a depiction of what two stroke type strings might actually look like. In this regard, each of the 64 different stroke types may be arbitrarily assigned different numerical labels. Thus the edit distance computation would compare the respective numeric labels of the stored annotation and the input query directly with each other. There is no need to convert the individual strings into ASCII characters and FIG. 6 is not intended to imply that such conversion is necessary.

Referring to FIG. 6, each time the annotation string stroke value matches the query string stroke value a cost of zero is assigned. Thus in FIG. 6, a zero cost is entered for the comparison of the first four string values "comp." To accommodate the possibility that a string/string comparison may involve insertion, deletion or substitution of values, a cost is assigned each time an insertion, deletion or substitution must be made during the comparison sequence. In the example of FIG. 6, the query string "compass" requires insertion of an additional value "r" after the value "p." A cost of one is assigned (as indicated at the entry designated 122). Continuing with the comparison, a substitution occurs between the value "e" of the stored annotation string and the value "a" of the query string. This results in an additional cost assignment of one being added to the previous cost assignment, resulting in a total cost of two, represented in FIG. 6 at 124. Aside from these insertion and substitution operations, the remainder of the comparisons match, value for value. Thus, the final "cost" in comparing the annotation string with the query string is two, represented in FIG. 6 at 126.

In the preceding discussion, a first minimum cost path was described in which "compass" is edited into "compress" by inserting an "r" and substituting an "e" for an "a." An alternative edit would be to substitute an "r" for an "a" and inserting an "e." Both of these paths have the same cost, namely two.

FIG. 7 gives another example of the edit distance computation technique. As before, strings of alphabetic characters are compared for demonstration purposes. As previously noted, this is done for convenience, to simplify the illustration, and should not be interpreted as implying that the strings must be first converted to alphanumeric text before the comparisons are made. Rather, the procedure illustrated in FIGS. 6 and 7 are performed on the respective stroke data (vector quantized symbols) of the respective stored annotation and input query strings.

FIG. 7 specifically illustrates the technique that may be used to perform a partial match (word spotting). In FIG. 7 the stored annotation "This is compression," is compared with the query string "compass." Note how the matched region 130 is extracted from the full string of the stored annotation by scanning the last row of the table to find the indices that represent the lowest value. Note that the first (initializing) row in FIG. 7 is all 0s—this allows the partial match to start anywhere along that database string.

The presently preferred edit distance procedure is enhanced over the conventional procedures described in the literature. Specifically, we have determined that in addition to the three basic editing operations (delete a character, insert a character, and substitute one character for another), it is useful to add two new operations when comparing pen stroke sequences. These new operations are "split" (substitute two characters for one character) and "merge" (substitute one character for two characters). These additional operations allow for errors made in stroke segmentation and generally leads to more accurate results.

The use of our enhanced edit distance procedure is illustrated in FIG. 7. In FIG. 7 the split operation is used to substitute the letters "re" in "compress" for the letter "a" in "compass." Note that the backtracking arrow in FIG. 7 spans one row but two columns, thereby signifying the multicharacter (merge) substitution. Hence the edit distance is one, not two, in this case. By way of comparison, FIG. 6 illustrates the basic edit distance algorithm without utilizing the two new multicharacter operations. Thus the cost (as depicted in FIG. 6) of editing "compass" into "compress" is two.

The above-described procedure works well in most user-drawn annotation applications. The combined use of vector quantizing and edit distance computation yield a system that is remarkably robust in its ability to find matching strings and substrings, even if they are not drawn precisely the same way by the user. Although the presently preferred embodiment has been illustrated here, a number of variations are possible without departing from the spirit of the invention. For example, if a faster match is desired, the system may perform an initial "first pass" match by simply finding all strokes that have a similar number of data points. This may be done by storing the number of data points as part of the feature data and then simply selecting or excluding those strokes that are not within a predetermined data point count. This type of first pass search can be performed quite quickly, as simple numeric matching algorithms are all that are required. The first pass technique based on data point count would not, however, allow matching substrings to be extracted as the edit distance computation permits. Where higher matching accuracy is desired a more computationally costly matching technique such as a Hidden Markov Model technique may be used as a final pass on the n-best hypotheses determined by the edit distance computation. Adding a highly accurate, but computationally costly processing stage to the final output may be used in systems where it is necessary to discriminate between a large number of highly similar strings.

What is claimed is:

1. A document search and retrieval system comprising:
   a memory having a first data structure for storing document data and a second data structure for storing annotation data;
   a user interface having drawing tool for user input of stroke data corresponding to a user-drawn symbol, said stroke data having spatial and temporal components;
   said user interface communicating with said second data structure to store said spatial and temporal components of said stroke data in association with a user-selected portion of said document data;
   a search engine communicating with said user interface for receiving a user-drawn search symbol comprising said stroke data;
   said search engine communicating with said second data structure for matching patterns in the spatial and temporal components of a user-drawn search symbol with patterns in the spatial and temporal components of stroke data stored in said second data structure to locate a potential match for the user-drawn input search symbol;
   said search engine accessing said first data structure to select a portion of said document data corresponding to the match hypothesis and thereby retrieve a portion of said document data that has an associated user-drawn symbol that substantially corresponds to said search symbol.

2. The system of claim 1 further comprising a document viewer communicating with said memory and with said user interface for displaying an image of a selected portion of said document data and for displaying user-drawn symbols associated with said selected portion.

3. The system of claim 1 wherein at least a portion of said user-drawn symbol comprises a nontext symbol.

4. The system of claim 1 wherein at least a portion of said search symbol comprises a nontext symbol.

5. The system of claim 1 further comprising stored rules set associated with said user interface and with said memory for storing a plurality of separate stroke data corresponding to separate user-drawn symbols in association with the same user-selected portion of said document data.

6. The system of claim 5 wherein said rules set distinguishes separate stroke data by detecting time elapsed between a first stroke and a second stroke.

7. The system of claim 5 wherein said rules set distinguishes separate stroke data by detecting spatial separation between a first stroke and a second stroke.

8. The system of claim 5 wherein said rules set distinguishes separate stroke data by detecting performance of a user interface control operation between a first stroke and a second stroke.

9. The system of claim 1 wherein said spatial component comprises a datum indicative of the relative position of said drawing tool.

10. The system of claim 1 wherein said temporal component comprises a datum indicative of the relative time at which said drawing tool is at a given position.

11. The system of claim 1 wherein said drawing tool comprises a pen and digitizing tablet.

12. The system of claim 1 further comprising image scanning means for storing document data in said first data structure.

13. The system of claim 12 wherein said image scanning means comprises a photocopy machine.

14. The system of claim 12 wherein said image scanning means comprises a photocopy machine and wherein said memory comprises a component of a computer network system coupled to said photocopy machine.

* * * * *